United States Patent
Wendler, Jr.

(10) Patent No.: US 6,245,273 B1
(45) Date of Patent: Jun. 12, 2001

(54) METHOD FOR EMBOSSING AND CRIMPING A MULTI-LAYER SHEET MATERIAL WEB ASSEMBLY

(75) Inventor: Roger E. Wendler, Jr., Sherwood, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/223,252

(22) Filed: Dec. 30, 1998

(51) Int. Cl.[7] ............... B29C 43/26; B29C 43/46; B29C 59/04; B29C 65/56
(52) U.S. Cl. ............... 264/249; 264/258; 264/280; 264/284; 264/296; 156/199; 156/290; 156/324; 425/324.1; 425/335; 425/363; 425/515
(58) Field of Search ............ 264/249, 258, 264/280, 284, 286, 287, 296; 156/209, 290, 324, 199; 425/335, 336, 324.1, 363, 385, 515

(56) References Cited

U.S. PATENT DOCUMENTS

| | | | |
|---|---|---|---|
| 4,125,659 | 11/1978 | Klowak et al. | 428/153 |
| 4,260,443 * | 4/1981 | Lindsay et al. | 156/220 |
| 4,284,465 * | 8/1981 | Walburn | 156/513 |
| 4,376,671 | 3/1983 | Schulz | 156/549 |
| 4,414,255 | 11/1983 | Tokuyama et al. | 428/154 |
| 4,507,173 | 3/1985 | Klowak et al. | 162/112 |
| 4,682,942 | 7/1987 | Gotchel et al. | 425/103 |
| 4,803,032 | 2/1989 | Schulz | 264/284 |
| 4,921,034 | 5/1990 | Burgess et al. | 162/109 |
| 5,096,527 * | 3/1992 | Biagiotti | 156/209 |
| 5,356,506 | 10/1994 | McNeil et al. | 156/553 |
| 5,383,778 | 1/1995 | Schulz | 425/363 |
| 5,490,902 | 2/1996 | Schulz | 162/109 |
| 5,562,805 * | 10/1996 | Kamps et al. | 162/117 |
| 5,622,734 * | 4/1997 | Clark et al. | 425/517 |
| 5,693,403 | 12/1997 | Brown et al. | 428/153 |
| 5,709,775 | 1/1998 | Trokhan et al. | 162/117 |
| 5,846,636 * | 12/1998 | Ruppel et al. | 428/154 |

* cited by examiner

*Primary Examiner*—Jan H. Silbaugh
*Assistant Examiner*—Michael I. Poe
(74) *Attorney, Agent, or Firm*—Brinks Hofer Gilson & Lione

(57) ABSTRACT

A method for embossing and crimping a plurality of sheet material web layers using an apparatus, including a first, second and third roll. The first roll including at least one element extending radially therefrom. The second roll has a resilient surface that engages the element to form a first nip therebetween. The third roll has a non-resilient surface that engages the element to form a second nip therebetween. In a preferred embodiment, the first roll includes at least a first and second element extending radially therefrom, with the first element having a greater radial height than the second element, which avoids contact with the third roll. The layers of sheet material web are embossed by the first and second elements as they are passed through the first nip, and are crimped together by the first element as they are passed through the second nip. In a preferred embodiment, the first roll includes a plurality of first and second elements arranged in a pattern. The method for embossing and crimping sheet material web assembly includes passing the plurality of layers of sheet material web through the first nip to emboss the layers and through the second nip to crimp the layers together. A sheet material web assembly includes a plurality of layers of sheet material web, with each layer having a plurality of embossments arranged in a pattern. The embossments in each layer are raised in the same direction and nest within the plurality of embossments in the other layers. A portion of the pattern of embossments further comprises a plurality of crimped embossments that bind the plurality of layers together.

21 Claims, 2 Drawing Sheets

METHOD FOR EMBOSSING AND CRIMPING A MULTI-LAYER SHEET MATERIAL WEB ASSEMBLY

BACKGROUND OF THE INVENTION

The present invention relates generally to a method and apparatus for embossing and crimping a multi-layer sheet material web assembly, and in particular, to a method and apparatus for embossing and crimping a multi-layer sheet material web by forming a pattern of embossments in the layers of the sheet material web assembly, a portion of which further comprise crimps to bind the layers together. The invention also relates to a multi-layer sheet material web assembly having a pattern of embossments and crimps.

It is well known in the field of paper making, and particularly in the field of manufacturing tissue products such as facial tissues, bath tissues and paper towels, to form a sheet material web assembly having a plurality of layers, or plies. Often, the individual layers of sheet material web, or the assembly as a whole, are provided with embossments, or raised portions, which can improve important product qualities of the assembly, such as the softness, water absorbency and bulk thereof. Often, the embossments are arranged in an aesthetically pleasing pattern to improve the overall appearance of the assembly.

In such multi-layer configurations, the individual layers of sheet material web are usually joined together to form the web assembly. Typically, the layers are joined with adhesives or crimping, or some combination thereof. Often, when crimping is used to bind the layers, the crimps are formed independent of the pattern of embossments, for example, in the form of lines running along the machine direction of the web assembly. Such crimp lines can interfere with the embossing pattern so as to detract from the pleasing appearance thereof. Alternatively, adhesives can be difficult to apply, and the application thereof can increase the cost of the web assembly.

SUMMARY OF THE INVENTION

Briefly stated, the invention is directed to an apparatus for embossing and crimping a plurality of layers of sheet material web to form a sheet material web assembly. The apparatus includes a first, second and third roll having substantially parallel axes of rotation. The first roll includes at least one element extending radially therefrom. The second roll has a resilient surface that engages the element of the first roll to form a first nip therebetween. The element is adapted to emboss concurrently the plurality of layers of sheet material web so as to form a plurality of embossments in each of the plurality of sheet material web layers as the layers are passed together through the first nip. The third roll has a non-resilient surface that engages the element of the first roll. The element of the first roll and the non-resilient surface of the third roll form a second nip therebetween. The element is adapted to crimp the plurality of layers of sheet material web together as they pass through the second nip.

In one embodiment, the first roll includes at least a first and second element extending radially therefrom, with the first element having a greater radial height than the second element. The first and second elements engage the resilient surface of the second roll to form a first nip therebetween. The non-resilient surface of the third roll is spaced apart from the second element of the first roll so as to avoid contact therewith, while the first element engages the non-resilient surface to form a second nip therebetween.

In a preferred embodiment, the first roll includes a plurality of first and second elements. Preferably, the first and second elements are arranged in a pattern so as to form a pattern of embossments on each of the layers of sheet material web as they pass through the first nip.

In another aspect of the invention, the apparatus further includes the plurality of layers of sheet material web, which are disposed in the first and second nips. Each layer of sheet material web includes a plurality of embossments formed by the first and second elements at the first nip. Each of the plurality of embossments in each layer of sheet material web is raised in the same direction and nests in the plurality of embossments raised in the other layers. The layers of sheet material web are joined by crimps formed by the first element at the second nip.

In another aspect of the invention, a method is provided for embossing and crimping the sheet material web assembly. The method includes the steps of passing the plurality of layers of sheet material web through the first nip, forming a plurality of embossments in each layer by pressing the layers between the element and the resilient surface of the second roll, passing the layers through the second nip and crimping the layers together by pressing the plurality of layers between the element and the non-resilient surface of the third roll.

In yet another aspect, a sheet material web assembly having a pattern of embossments and crimps is provided. The sheet material web assembly includes a plurality of layers of sheet material webs. Each layer of sheet material web includes a first and second surface, with the first surface of each layer facing the same direction as the first surfaces of the other layers. Each of the layers includes a plurality of embossments raised from the first surface and nesting within the plurality of embossments of the other layers. The embossments are arranged in a pattern on each layer, with a portion, or all, of the pattern of embossments further comprising a plurality of crimps binding the layers together.

The present invention provides significant advantages over other apparatuses and methods used to emboss and crimp multi-layer sheet material web assemblies. In particular, because the first elements of the first roll are used both to emboss and to crimp the plurality of layers, as the layers remain registered on the first elements as they pass through the first and second nips, the crimps can be incorporated into the pattern of embossments. In this way, the crimps, which attach or bind the plurality of layers of sheet material web together, can be hidden within the pattern of embossments, rather than interfering with the pattern, which can adversely affect the aesthetics of the sheet material web assembly.

In addition, instead of employing separate rolls to crimp and emboss the assembly, a single roll having elements that both crimp and emboss the sheet material web assembly can be used to emboss and crimp the layers of sheet material web. In this way, the assembly and maintenance costs of the apparatus and method can be reduced.

The present invention, together with further objects and advantages, will be best understood by reference to the following detailed description taken in conjunction with the accompanying drawings.

BRIEF DESCRIPTION OF THE DRAWINGS

Many of the features and dimensions portrayed in the drawings, and in particular the presentation of the size (height and length) of the embossments and crimps relative to the thickness of the sheet material web, the radial height (and length) of the first and second elements relative to the diameter of the rolls, and the thicknesses of the layers of sheet material web relative to the diameter of the rolls, have been somewhat exaggerated for the sake of illustration and clarity.

DETAILED DESCRIPTION OF THE PREFERRED EMBODIMENTS

Figure 1:
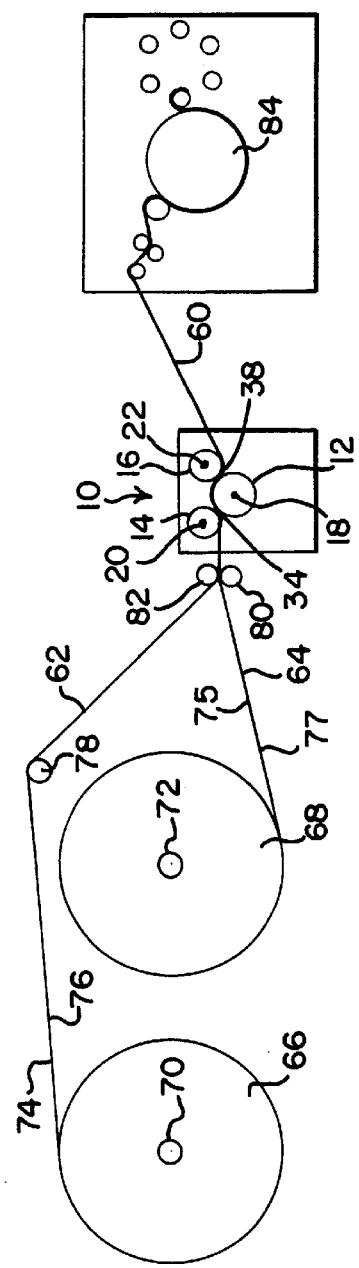
FIG. 1 is a side view of an apparatus for crimping and embossing a multi-layer sheet material web assembly.

Referring to the drawings, FIG. 1 shows an apparatus 10 for embossing and crimping a multi-layer sheet material web assembly 60 having a plurality of layers of sheet material web 62, 64. It should be understood that the term "layer," as used herein, is meant to include an individual sheet material web made of one or more plies of material, and preferably, a sheet material web comprised of a single ply of material. It should also be understood that the prefix "multi" and the term "plurality," as used herein, are defined to mean "more than one." The term "sheet material web," as used herein, is meant to include fibrous web structures, such as paper products, including tissue paper, cardboard, and the like, and also polymeric structures, all of which can be embossed and joined to other sheet material web structures by crimping, as those terms are defined below.

Figure 2:
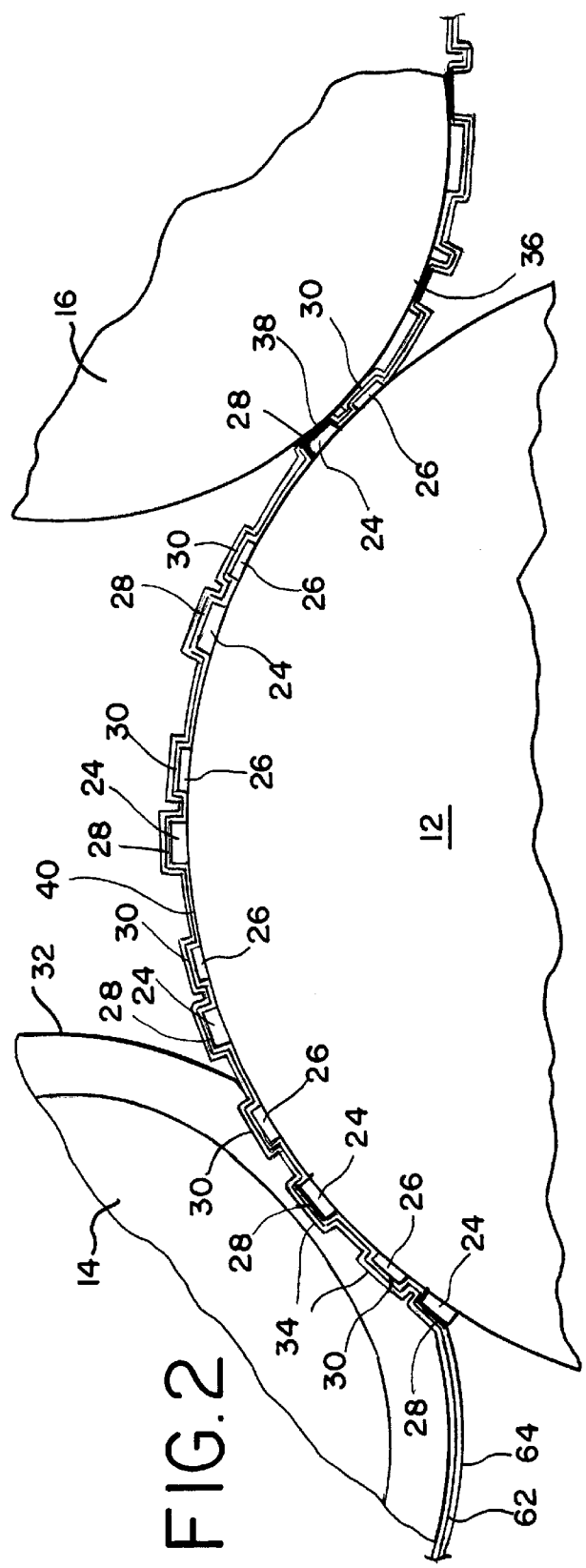
FIG. 2 is an enlarged partial side view of a first, second and third roll, and the first and second nips formed therebetween.
Figure 3:
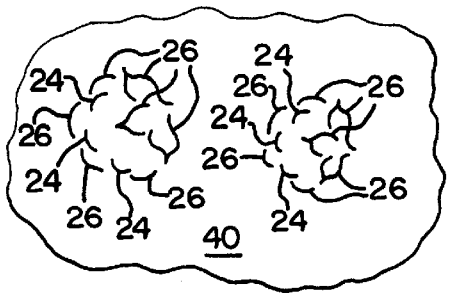
FIG. 3 is a partial view of a portion of the surface of the first roll showing a plurality of first and second elements arranged in a pattern.
Figure 5:
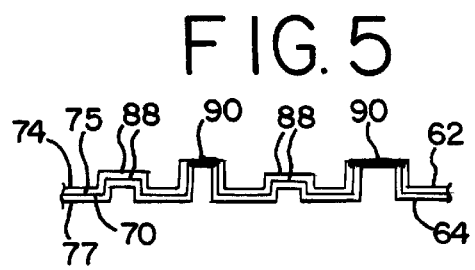
FIG. 5 is a partial cross-section of the sheet material web assembly taken along line 5—5 in FIG. 4.

As shown in FIG. 1, the apparatus 10 includes a first roll 12, a second roll 14 and a third roll 16 having substantially parallel axes of rotation 18, 20, 22, respectively. Referring to FIGS. 2 and 3, the first roll 10, otherwise referred to as an embossing and crimping roll, includes a plurality of first elements 24 having a first radial height, as measured from a reference point, e.g., the axis of the roll or, alternatively, the circumferential base surface 40 of the roll, and a plurality of second elements 26 having a second radial height, as measured from the same reference point. Each of the first and second elements 24, 26 have a contact surface 28, 30, respectively. As shown in FIG. 2, the first elements 24 have a greater radial height than the second elements 26. For example, in one suitable configuration, the second elements have a radial height of 0.040 inches as measured from the surface 40 of the first roll, while the first elements have a radial height of 0.045 inches. Preferably, the first elements are at least 0.005 inches higher than the second elements so as to avoid engagement, or contact, with the third roll 16, as explained below.

It should be understood that the term "element" refers generally to any protuberance, boss, lug, finger, head, step, surface, or the like, having a different radial height than any adjacent protuberance, boss, lug, finger, head, step, surface, or the like, when measured from the axis of the roll, or some other common reference point. However, it should also be understood that an element may also have a variable radial height along the surface of the element. Moreover, it should be understood that the "base surface" of the first roll is understood to be the circumferential surface of the roll having the least radial height when measured from the axis of the roll, or some other common reference point. In this way, a roll having an outer circumferential surface of three different radial heights, when measured from the axis of the roll, should be understood as having a base surface and a first and second element, which correspond to the three surfaces respectively. One of skill in the art should also understand that the first roll could also include more than two different types of elements, and that the disclosure of a first and second element is meant to be illustrative, rather than limiting. In any event, when two or more elements of various heights are used, the elements will form embossments of varying height corresponding to the radial height of the respective elements.

As best shown in FIG. 2, the second roll 14, otherwise referred to as a backing roll, has an outer surface 32 made of a resilient material, such as polyurethane, natural rubber, or any other material suitable for creating a soft nip with the first and second elements. For example, the second roll may be configured as a non-resilient steel roll with an outer layer or cover made of a resilient, deformable material. Such rolls, made with resilient materials, typically have a hardness in the range of from about 30 shore A to about 98 shore A. Preferably, the second roll 32 has a smooth outer surface. The axes 18, 20 of the first and second rolls are positioned such that the first and second elements 24, 26 of the first roll 12 engage or contact the outer resilient surface 32 of the second roll to form a soft first nip 34 therebetween. Since the outer surface 32 that contacts the first and second elements is resilient, or elastic, the first elements 24 are allowed to penetrate into the second roll 14 to such a depth so as to also allow the second elements 26 to be brought into contact therewith. Indeed, in certain configurations, the first and second elements may penetrate to such a depth as to allow the surface 40 of the first roll 12 to contact the surface 32 of the second roll so as to form a calendering nip therebetween, as explained for example, in U.S. Pat. No. 5,693,403, assigned to Kimberly-Clark Worldwide, Inc., the same assignee named in the present application, and which is hereby incorporated herein by reference. Alternatively, the first and second rolls can be configured so as to allow only the first and second elements to contact the second roll.

The third roll 16, otherwise referred to as an anvil roll, has a non-resilient surface 36, meaning it will not deform elastically so as to create a nip with elements of different radial heights. Preferably, the third roll is made of steel and has an outer surface with a hardness of about 58 Rockwell C. As with the second roll, the third roll 16 preferably has a smooth outer surface. The first and third axes 18, 22 of the first and third rolls 12, 16 are positioned such that the first elements 24 of the first roll 12, and more particularly, the outer contact surface 28 of the element, engage or contact the outer non-resilient surface 36 of the third roll to form a hard second nip 38 therebetween. The second elements 26, which have a lesser radial height than the first elements 24, are spaced apart from the outer non-resilient surface 36 and do not come in contact therewith. Preferably, the first elements 24 of the first roll have the same or slightly greater hardness than the surface 36 of the third roll. For example, in one suitable embodiment, the first elements are hardened to about 62 Rockwell C.

Referring again to FIG. 1, a plurality of layers of sheet material web comprising a first and second layer 62, 64 are shown as being unrolled from a first and second roll 66, 68 of sheet material web having axes of rotation 70, 72. Each layer has a first surface 74, 75 and a second surface 76, 77, respectively. One of skill in the art should understand that additional rolls of sheet material web could be placed in series with the first and second rolls of sheet material web so as to provide additional layers of sheet material web. Accordingly, it should be understood that a plurality comprised of two layers is meant to be illustrative, rather than limiting.

Figure 6:
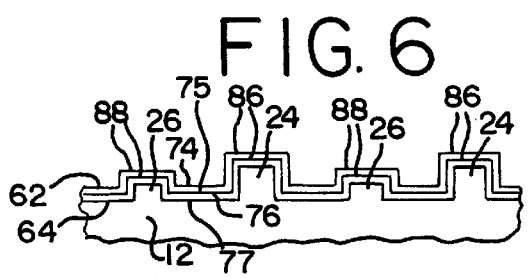
FIG. 6 is a partial cross-section of the plurality of layers of sheet material web as they leave the first nip and are registered on the first roll.

The first and second layers 62, 64 are guided by a series of rollers 78, 80, 82 and are thereafter brought into contact, with the second surface 76 of the first layer 62 contacting the first surface 75 of the second layer 64, so as to be passed together through the first nip 34 formed between the first and second elements 24, 26 of the first roll and the resilient surface 32 of the second roll. Referring to FIGS. 2 and 6, the first and second layers 62, 64, after leaving the first nip, are registered on the first and second elements 24, 26 of the first roll and are thereafter passed through the second nip 38 formed between the first elements 24 of the first roll and the non-resilient surface 36 of the third roll. The joined layers 62, 64 are thereafter wound onto a roll 84, as shown in FIG. 1.

It should be understood that the first, second and third rolls can be incorporated into any number of places in the paper making process where two or more layers are brought together for embossing and crimping. For example, the apparatus can be incorporated into a converting or finishing line, where further operations are performed on the sheet material web assembly, including, for example, calendering, slitting and/or perforating the assembly.

In operation, as best shown in FIGS. 2 and 6, both the first and second elements 24, 26 form embossments 86, 88 on each layer 62, 64 of sheet material web as the plurality of layers 62, 64 pass through the first nip 34. The term "embossing" should be understood to mean an ornamentation with raised work or a raising of the surface of the layer into a boss. The term "embossment" should be understood to mean a portion that is raised from a surface. The embossments 86 formed by the first elements 24 have a greater raised height than the embossments 88 formed by the second elements 26. The plurality of embossments 86, 88 formed in each layer extend or are raised from a same facing surface 74, 75 of each layer 62, 64, shown in FIG. 6 as the first surface. Depending on the positioning of the first, second and third rolls, the first surface can be the upper or lower surface of the layer. Since the first and second elements 24, 26 concurrently emboss the plurality of layers 62, 64 together, the plurality of embossments 86, 88 in the first layer 62 are nested within the plurality of embossments 64 in the second layer, as shown in FIG. 6. Because the second roll 14 has a resilient surface, the first and second elements 24, 26 do not crimp the layers together, as that term is defined below, although some binding of the layer may occur.

After leaving the first nip 34, the plurality of layers 62, 64 are registered on the first and second elements 24, 26 and are thereafter carried together through the second nip 38. As the plurality of layers are passed through the second nip, the first elements 24 crimp the layers 62, 64 together at the embossments 86 formed by the first elements in the first nip so as to form a crimped embossment 90, otherwise referred to as a crimp. The term "crimp" should be understood to mean the attachment or binding of the plurality of layers by mechanical press bonding, where the fibers of the layers are crushed together so as to create a mechanical bond between the layers, e.g., a mechanical tissue bond between two or more plies of tissue. In addition to crimping, adhesive can also be applied between portions of the layers to help bond or join the layers. Crimping is accomplished by pressing together adjacent surfaces 75, 76 of the layers 62, 64 between the first elements 24 of the first roll 12 and the non-resilient surface 36 of the third roll 16 by applying a pressure between the rolls 12, 16 at the second nip 38.

Figure 4:
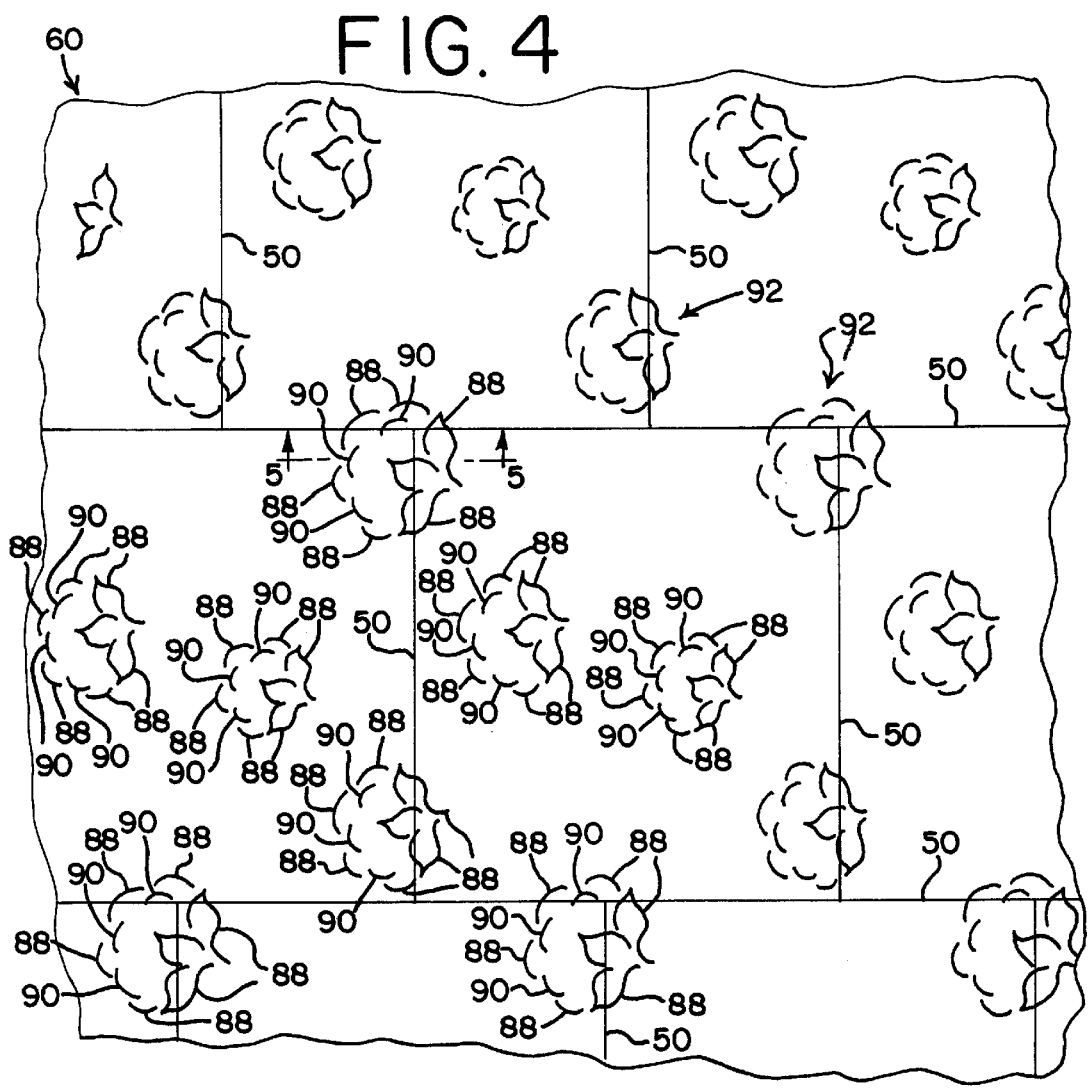
FIG. 4 is a plan view of a sheet material web assembly having a pattern of embossments and crimps.

The first and second elements 24, 26 are preferably arranged in a uniform pattern. For example, as shown in FIG. 3, the pattern comprises a repeating pictorial 92 of cotton blossoms of various sizes. The cotton blossom pictorial is meant to be illustrative rather than limiting. As shown in FIG. 3, each pictorial is formed by at least one first element 24 and at least one second element 26, and preferably a plurality of first and second elements. In turn, as best shown in FIG. 4, each pictorial embossment, otherwise referred to as a spaced-apart discrete spot embossment, includes at least one uncrimped embossment 88 and at least one crimped embossment 90. The pattern of repeating pictorials, or spot embossments, is arranged in grids defined by imaginary layout lines 50, such that each grid has the same pattern of embossing and crimping pictorials as the other grids.

One of skill in the art should understand that it is not the specific arrangement of the pattern, or the pictorial forming the pattern, that is important, but rather that at least a portion of the pattern, or pictorial forming the pattern, includes crimped embossments. Indeed, the pictorial can assume an almost infinite number of shapes, including such things as various plant and animal forms, articles of manufacture or even simple geometric shapes. Moreover, one of skill in the art should understand that the pattern could be comprised merely of repeating lines or closely spaced elements such as dots, referred to as a "continuous" embossing pattern, rather than a series of pictorials, wherein at least a portion of the pattern comprises crimped embossments. Moreover, one of skill in the art should understand that the first and second elements could be arranged such that entire pictorials are comprised entirely of crimped embossments, while other entire pictorials are comprised entirely of non-crimped embossments.

In yet another alternative embodiment, the entire portion of the pattern or arrangement of embossments is comprised entirely of crimped embossments. In this embodiment, the first roll includes only one set of radially extending elements having substantially equal heights. The same elements first emboss and then crimp the plurality of layers as the layers pass through, respectively, the first and second nips. In this way, the entire pattern of embossments are crimped embossments, or raised portions which join together the layers by mechanical press bonding. Preferably, the embossments making up the pattern are sufficiently spaced apart so as to avoid making the web assembly overly stiff.

Although the plurality of layers 62, 64 are shown as preferably passing first through the soft first nip 34 formed between the first and second elements 24, 26 of the first roll and the surface 32 of the second roll, and thereafter passing through the hard second nip 38, it should be understood that the order of the nips could be reversed, with the plurality of layers being first crimped and thereafter embossed Although the present invention has been described with reference to preferred embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

I claim:

1. A method for embossing and crimping a sheet material web assembly having a plurality of sheet material web layers, said method comprising:

providing a plurality of layers of a sheet material web;

providing a first roll having a first axis of rotation, said first roll comprising at least one first element extending radially therefrom and at least one second element extending radially therefrom, wherein said at least one first element has a greater radial height than said at least one second element;

providing a second roll having a second axis of rotation substantially parallel to said first axis of rotation and comprising a resilient surface engaging said at least one first and second elements so as to form a first nip therebetween as said first and second rolls rotate relative to each other so as to bring said at least one first and second elements into engagement with said resilient surface;

providing a third roll having a third axis of rotation substantially parallel to said first and second axis of rotation and comprising a non-resilient surface engaging said at least one first element of said first roll so as to form a second nip therebetween as said first and third rolls rotate relative to each other so as to bring said at least one first element into engagement with said non-resilient surface, wherein said at least one second element is spaced from said non-resilient surface of said third roll;

passing said plurality of layers of sheet material web through said first nip formed between said at least one first and second elements of said first roll and said resilient surface of said second roll;

forming an embossment in each of said layers of sheet material web by pressing said plurality of layers between said at least one first and second elements of said first roll and said resilient surface of said second roll as said plurality of layers are passed through the first nip;

passing said plurality of layers of sheet material web through said second nip formed between said at least one first element of said first roll and said non-resilient surface of said third roll;

crimping said plurality of layers of sheet material web together by pressing said plurality of layers between said at least one first element of said first roll and non-resilient surface of said third roll as said plurality of layers are passed through said second nip while said at least one second element is spaced from said non-resilient surface.

2. The method of claim 1 wherein said second roll comprises an outer surface formed of rubber.

3. The method of claim 1 wherein said third roll is steel.

4. The method of claim 1 wherein said at least one first element has a radial height at least 0.005 inches greater than the radial height of said at least one second element.

5. The method of claim 1 wherein said crimping comprises forming a mechanical bond between said plurality of layers, wherein said mechanical bond is the only type of bond joining said plurality of sheet material web layers.

6. The method of claim 1 wherein said first roll comprises a plurality of first and second elements.

7. The method of claim 6 wherein said plurality of said first and second elements are arranged in a pattern so as to provide a corresponding pattern on said sheet material web made up of crimps and embossments.

8. The method of claim 7 wherein said pattern comprises a plurality of repeating pictorials, wherein each of said pictorials is formed by at least one of said first elements and at least one of said second elements, whereby the crimps binding said plurality of said layers of sheet material web are hidden within said pictorial.

9. A method for embossing and crimping a sheet material web assembly having a plurality of sheet material web layers, said method comprising:

providing a plurality of layers of sheet material web;

providing a first roll having a first axis of rotation, said first roll comprising at least one first element extending radially therefrom and at least one second element extending radially therefrom, said at least one first element having a greater radial height than said at least one second element;

providing a second roll having a second axis of rotation substantially parallel to said first axis of rotation and a resilient surface engaging said at least one first element and said at least one second element so as to form a first nip therebetween as said first and second rolls rotate relative to each other so as to bring said at least one first element and said at least one second element into engagement with said resilient surface;

providing a third roll having a third axis of rotation substantially parallel to said first and second axis of rotation and a non-resilient surface engaging said at least one first element of said first roll so as to form a second nip therebetween as said first and third rolls rotate relative to each other so as to bring said at least one first element into engagement with said non-resilient surface;

passing said plurality of layers of sheet material web through said first nip formed between said at least one first and second elements of said first roll and said resilient surface of said second roll;

forming an embossment in each of said layers of sheet material web by pressing said plurality of layers between said at least one first and second elements of said first roll and said resilient surface of said second roll as said plurality of layers are passed through said first nip;

passing said plurality of layers of sheet material web through said second nip formed between said at least one first element of said first roll and said non-resilient surface of said third roll, wherein said at least one second element is spaced apart from said non-resilient surface of said third roll so as to avoid contact therewith; and crimping said plurality of layers of sheet material web together by pressing said plurality of layers between said first element of said first roll and said non-resilient surface of said third roll as said plurality of layers are passed through said second nip and thereby forming a mechanical bond between said plurality of layers, wherein said mechanical bond is the only type of bond joining said plurality of layers of sheet material web.

10. The method of claim 9 wherein said second roll comprises an outer surface formed of rubber.

11. The method of claim 9 wherein said third roll is steel.

12. The method of claim 9 wherein said first element has a radial height at least 0.005 inches greater than the radial height of said second element.

13. The method of claim 9 wherein said first roll comprises a plurality of first and second elements.

14. The method of claim 13 wherein said plurality of said first and second elements are arranged in a pattern so as to provide a corresponding pattern on said sheet material web made up of crimps and embossments.

15. The method of claim 14 wherein said pattern comprises a plurality of repeating pictorials, wherein each of said pictorials is formed by at least one of said first elements and at least one of said second elements, whereby the crimps binding said plurality of said layers of sheet material web are hidden within said pictorial.

16. A method for embossing and crimping a sheet material web assembly having a plurality of sheet material web layers, said method comprising:

providing a plurality of layers of a sheet material web;

providing a first roll having a first axis of rotation, said first roll comprising a plurality of first elements extending radially therefrom and a plurality of second elements extending radially therefrom, wherein said plurality of first elements have a greater radial height than said plurality of second elements, and wherein said pluralities of first and second elements are arranged in a pattern of repeating pictorials;

providing a second roll having a second axis of rotation substantially parallel to said first axis of rotation and comprising a resilient surface engaging said pluralities of first and second elements so as to form a first nip therebetween as said first and second rolls rotate relative to each other so as to bring said pluralities of first and second elements into engagement with said resilient surface;

providing a third roll having a third axis of rotation substantially parallel to said first and second axis of rotation and comprising a non-resilient surface engaging said plurality of first elements of said first roll so as to form a second nip therebetween as said first and third rolls rotate relative to each other so as to bring said plurality of first elements into engagement with said non-resilient surface, wherein said plurality of second elements are spaced from said non-resilient surface of said third roll;

passing said plurality of layers of sheet material web through said first nip formed between said pluralities of first and second elements of said first roll and said resilient surface of said second roll;

forming an embossment in each of said layers of sheet material web by pressing said plurality of layers between said pluralities of first and second elements of said first roll and said resilient surface of said second roll as said plurality of layers are passed through the first nip, wherein said embossment comprises a pattern of repeating pictorials formed in said plurality of layers of sheet material web;

passing said plurality of layers of sheet material web through said second nip formed between said plurality of first elements of said first roll and said non-resilient surface of said third roll;

forming a crimp in said plurality of layers of sheet material web by pressing said plurality of layers between said plurality of first elements of said first roll and said non-resilient surface of said third roll as said plurality of layers are passed through said second nip while said plurality of second elements are spaced from said non-resilient surface, wherein said crimp is hidden in said pattern of repeating pictorials formed in said plurality of layers of sheet material web.

17. The method of claim 16 wherein said second roll comprises an outer surface formed of rubber.

18. The method of claim 16 wherein said third roll is steel.

19. The method of claim 16 wherein said plurality of first elements have a radial height at least 0.005 inches greater than the radial height of said plurality of second elements.

20. The method of claim 16 wherein said forming said crimp in said plurality of layers comprises forming a mechanical bond between said plurality of layers, wherein said mechanical bond is the only type of bond joining said plurality of sheet material web layers.

21. The method of claim 16 wherein said plurality of layers of sheet material web comprised two layers.

* * * * *